Patented Sept. 15, 1953

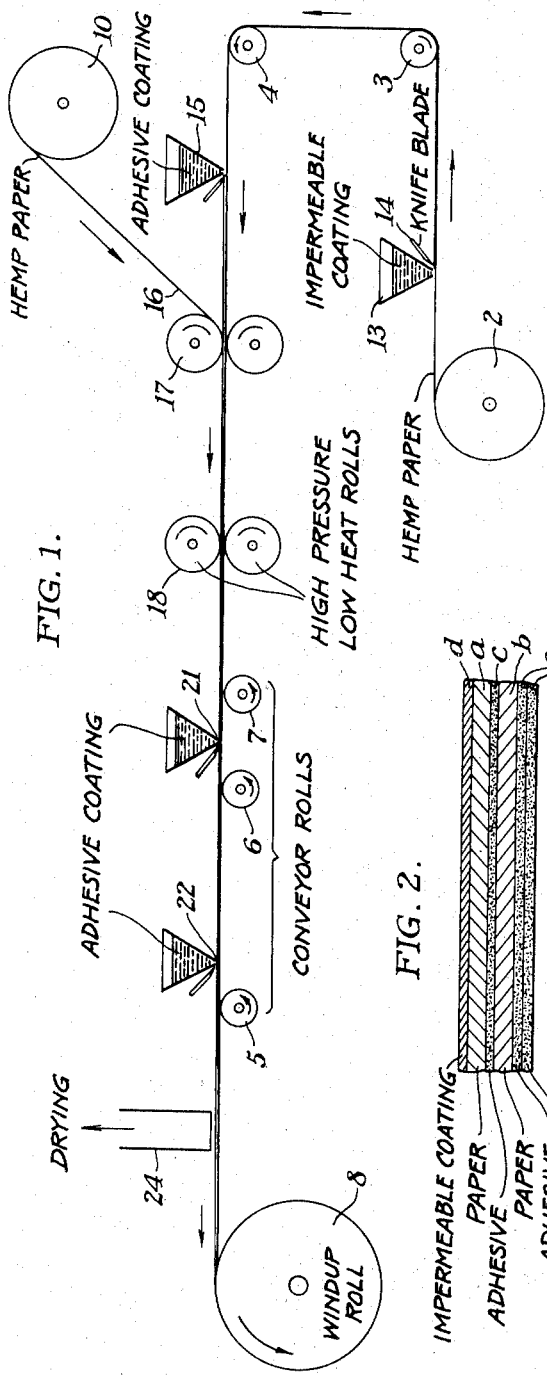
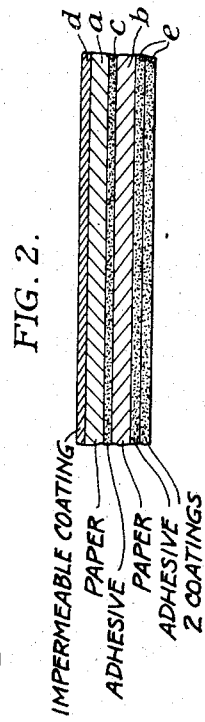
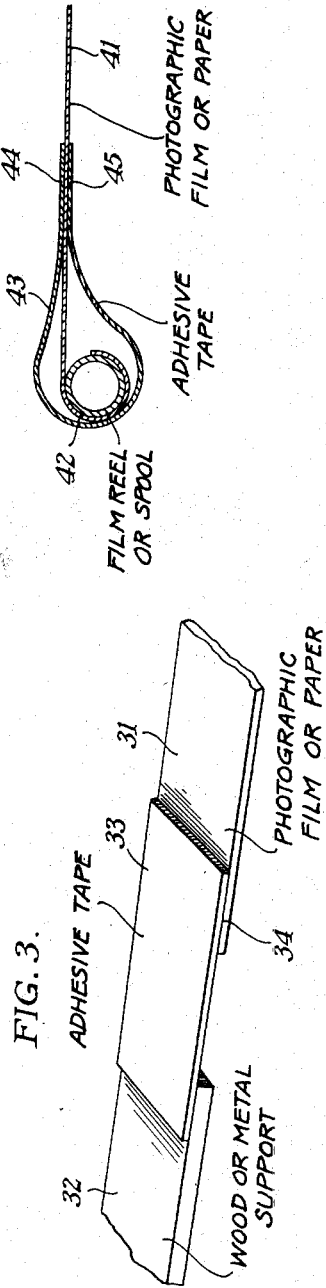

2,652,351

UNITED STATES PATENT OFFICE 2,652,351

PAPER ADHESIVE TAPE

James S. Gerhardt, Rochester, N. Y., assignor to Eastman Kodak Company, Rochester, N. Y., a corporation of New Jersey Application September 2, 1949, Serial No. 113,828

3 Claims. (Cl. 154—53.5)

This invention relates to paper adhesive tape. More particularly, this invention concerns a high-strength, relatively low-cost, improved paper adhesive tape which has special utility in the photographic industry.

There are, of course, many types of tape available on the market. Perhaps the most familiar type of tape is comprised of a transparent cellulosic body or base member which carries a pressure-sensitive adhesive. Because of the relative impermeability and smoothness of the transparent cellulosic material, the tape may be wound in rolls, the adhesive not unduly attaching to the smooth cellulosic base. Therefore, the tape may be unwound.

While such type of tape utilizing transparent cellulosic materials as the body member has considerable merit for many uses, it is frequently quite difficult to sever or break the tape laterally when applying it to a number of individual things. Even though longitudinal strength of the tape may be desired, as just indicated, too great a lateral strength may be disadvantageous because in using tape removed from a roll it frequently is desired to detach various lengths of the tape for different usages. In addition, the aforementioned type of tape involving transparent cellulosic base materials is expensive to manufacture not only because of the relatively greater cost of the transparent cellulosic sheeting, as compared with paper, but due to the impermeability and inertness of the cellulosic sheeting material. That is, in order to apply adhesive coatings and the like thereto, in manufacturing the tape it is frequently necessary to apply pre-subs for rendering the transparent base susceptible to receiving the adhesive in a manner so that a sufficiently strong bond exists whereby the adhesive and the transparent cellulose back or base will not separate.

When it has been attempted to use the aforementioned type of tape constructed from transparent cellulosic sheeting for certain purposes in the photographic industry it has been found that difficulties have arisen possibly due to the fact that transparent cellulosic sheeting material from which the tape was constructed, because of its plastic nature or otherwise, presented problems in causing injury to the photographic materials. This difficulty may arise from certain plasticizers or residual solvents or other components contained in the transparent cellulosic base.

Therefore, it is apparent that the development of a relatively economical but strong adhesive tape which may be used for packaging or otherwise in association with photographic materials represents a highly desirable and practical result. I found that a very useful and relatively low-cost paper adhesive tape may be prepared and used as described in detail hereinafter.

For assistance in understanding the present invention reference will be made to the attached drawing forming a part of the present application. In this drawing Figure 1 is a diagrammatic side elevation view of an apparatus arrangement which may be used for the continuous manufacture of my new tape. Figure 2 is a detailed view on a very much magnified scale of a cross section of one embodiment of my new tape. Figures 3 and 4 are diagrammatic elevation views illustrating certain instances under which my tape may be used in longitudinally attaching film to a metal or wooden support.

Considering now the broader aspects of my tape and its manufacture, I have found that rather than employing the expensive transparent cellulosic sheeting material, as the base or foundation member of the tape, I may secure a very strong tape by employing paper strips. That is, assuming it is desired to prepare a tape of one inch width, two strips of paper such as ordinary hemp paper bonded together by a suitable adhesive is used as the base or foundation member for my tape. Of course, rather than employing the narrow strips at the onset it is possible and frequently desirable to use wide sheets of paper bonding them together in the same manner, as will be described in detail, and thereafter slit either the foundation member or the finished tape into rolls of tape of the desired width.

I found that by so bonding, for example, two layers of paper together, as will be described in detail, any weak spots in one layer of paper will not, excepting in very rare cases, fall superimposed upon the second layer of paper where the second layer of paper may have a weak spot. That is, by merely making a foundation or base member of two strips of paper fed into the machine at random as will be set forth in detail, there is obtained a paper base member, from ordinary paper, having very high longitudinal tensile strength. On the other hand, the strength of the foundation member thus obtained, while resisting lateral severance to a greater extent than a single paper strip, may be severed sufficiently easily laterally by tearing or cutting as to render its use convenient when it is desired to prepare small strips of the tape for use.

To the strong paper foundation member just described I apply a more or less water-proof impermeable or inert coating on one side, namely the side opposed to the adhesive. One purpose of this coating is in order that on winding the tape into rolls the adhesive will not cause the tape to stick together so that it may not be unwound. On the other side, namely that opposed to the impermeable coating just mentioned, I preferably apply a plurality of layers of pressure-sensitive adhesive inasmuch as I have found that several layers appear to give a better product than a single proportionately thicker layer. As will be apparent from the detailed description hereinafter, the components contained in the coatings and adhesive and the like will be ones that do not act adversely on photographic materials whereby my finished tape may be used in close proximity to such photographic materials without damage. That is, I contemplate using my tape for direct attachment to photographic film and paper and the like without damaging the emulsions or similar photographic components on such film or paper.

Reference is now made to Figure 1 of the drawing for arriving at a more detailed understanding of my invention. There is shown at 2 a roll of ordinary paper of reasonably good quality such as hemp paper of about .0025 inch thick. As mentioned above, the width of this paper may be as desired depending upon whether the tape is to be produced directly or the finished roll later on split into the tape widths that are desired. This paper is threaded over the various idler rolls 3 and 4 and the conveyor rolls 5, 6, and 7 and attached to the wind-up roll 8. Another roll of ordinary paper such as hemp paper is provided at 10 and is threaded through and over the various rolls to wind-up reel 8 for the purposes of producing my strong foundation or base member as will be apparent as the description proceeds. The wind-up roll is power-driven in a conventional manner to move the paper thus threaded at a suitable speed for coating as will be described.

Referring further to Figure 1, positioned at some intermediate point between rolls 2 and 3 is a hopper mechanism 13 provided with a knife blade or equivalent structure 14. This construction just mentioned may be of any conventional arrangement for applying a thin coating of the impermeable type mentioned above. If the paper is first coated with the impermeable coating, this prevents the adhesive striking through. As mentioned, one function of this impermeable coating is to provide a suitable surface when the tape is rolled up so that one strip will not adhere to the adjacent strip. Information concerning the specific composition of this impermeable coating will be set forth hereinafter. Further along the paper strip and on the opposite side thereof there is provided another coating hopper 15 of any conventional construction for applying an adhesive coating aforementioned to this opposite side of the paper strip. This coating mechanism is positioned before the introduction of the second strip of paper, as at 16, from roll 10. The second strip of paper 16 feeds through two or more pairs of rolls 17 and 18. These may be metal rolls such as steel rolls operated at high pressure and low heat (say for example at a temperature of between 30 and 90° C.). This heating may be accomplished either by injecting steam or hot oil into the interior of the roll or by electric heating, the exact manner of heating not being a limitation on the present invention.

Positioned beyond the last-mentioned pair of calendering rolls 18 are a plurality of additional coating hoppers 21 and 22 of a structure similar to those previously referred to. These hoppers 21 and 22 are for applying a plurality of coatings of adhesive materials to the second layer of paper just mentioned, the adhesive being applied to the paper side. As mentioned above, it is preferred to apply a plurality of coatings of adhesive in the final steps under description. While two coating operations are shown, three or more layers of adhesive, depending upon the quantity and thickness of adhesive which is desired may be coated onto the tape. Thereafter the finished tape is wound up on reel 8. There may be interposed at 24 some type of a drying mechanism (diagrammatically indicated), depending upon the solvent used for dissolving the adhesive and the like details. The preferred adhesive composition will be described below in the various examples which follow.

The operation of the above-described apparatus for producing my novel tape is largely apparent from the preceding description. However, for the purposes of further clarity, an example will be set forth concerning the production of tape particularly useful in the photographic industry. Referring to Figure 1 and considering the following example, rolls 2 and 10 are provided with a supply of commercial hemp paper of about .002 inch thickness. The coating device 13 is supplied with an impermeable coating made up of nitrocellulose (plasticized with tri-cresyl phosphate) and shellac and dissolved in an acetone-ethyl alcohol solvent. I found that the shellac compound (⅓ shellac, ⅔ alcohol) should constitute about ½ of the coating solution. The other half of the coating solution is made up of an acetone solution of nitrocellulose (plasticized with tri-cresyl phosphate) in which about 20% nitrocellulose and 10 to 12% of tri-cresyl phosphate are used.

The coating devices 15, 21, and 22 are filled with an adhesive mixture made up of rubber, rosin, pitch, and zinc oxide. The term "pitch" as used here includes Venice turpentine, Burgundy pitch (see Hackh's Chemical Dictionary, by Ingo W. D. Hackh. Philadelphia: Blakiston's Son & Co., Inc., 1937), and Piccolyte S–115 (see Handbook of Material Trade Names, by Zimmerman and Lavine. Dover, N. H.: Industrial Research Service, 1946), and the like. I prefer to use a rather good grade of material such as pale crepe rubber and otherwise choose ingredients of a quality free from components which might exert an adverse effect on photographic materials. The proportions of the aforementioned ingredients which may be used are approximately as follows:

Rubber, between 7 and 11 parts
Rosin, between 3.5 and 5.5 parts
Pitch, between 5 and 8 parts
Zinc oxide, between 4 and 6 parts As will be noted, this rubber-containing adhesive which I refer to corresponds to the rubber-containing adhesive used on surgeon's tape. The technic of formulating, dissolving, and otherwise preparing such type material, used in the industry, may likewise be used in the present situation. Therefore, I will only briefly describe the preparation of a batch of my adhesive as follows: Soak pale crepe sheet rubber in benzene. After a soaking period of 7 to 21 days the rubber solution is loaded into a heavy-duty mixer such as a sigma-type blade mixer. The zinc oxide is then added as a mixture previously ground with cornstarch, lanolin, and benzene. After thorough mixing, the resinous materials are added as solutions in benzene. The final viscosity is adjusted by the addition of benzene. In place of benzene other usual solvents may be used.

After the paper has been threaded through the equipment to the wind-up reel 8 and the coating devices filled with the respective coating compositions, heat and pressure are applied to the pairs of rolls 17 and 18 and the equipment set in operation producing the finished tape, the construction of which will be more apparent by referring to Figure 2.

As will be noted from Figure 2, the foundation or the body member of the tape is comprised of the two pieces of paper *a* and *b* securely welded together by the adhesive *c*. One side of this body member is coated with the impermeable coating *d*. The other side of this body member, in this particular instance, is provided with two coatings of adhesive designated *e*. Therefore, the composite tape of my invention is made up of a tensilely strong foundation member provided with a plasticized-nitrocellulose coating on one side and a plurality of adhesive coatings on the other side. As previously mentioned, even though my tape is constructed from paper, by virtue of the composite constructions just described extremely excellent tensile strength is possible even when employing ordinary low-cost paper stock.

While the above combination and composition is preferred, certain variations may be made. For example, the impermeable coating may be as follows:

| | Per cent |
|---|---|
| Cellulose acetate butyrate | 20.0 |
| Opal wax | 2.0 |
| Benzene | 40.0 |
| Ethyl alcohol | 38.0 |
| | 100.0 |

The adhesive coating, for example, might be altered somewhat as follows:

| | Parts | Percentage |
|---|---|---|
| Crepe rubber | 7.60 | 33.00 |
| Zinc oxide | 4.90 | 21.00 |
| Lanolin | 1.40 | 6.00 |
| Rosin | 3.40 | 14.70 |
| Burgundy pitch | 1.70 | 7.35 |
| Venice turpentine | 1.60 | 7.00 |
| Piccolyte | 2.50 | 10.95 |
| | 23.10 | 100.00 |

The excellent strength of my paper tape is shown by the following data wherein different loads were applied to various widths of the tape affixed with a certain number of square inches of adhesive in contact with different surfaces such as wood, metal, plastic, and the like.

|  | Breaking load in lbs. per 1-inch width [1] |
|---|---|
| A. Single thickness paper tape (control) | 18–22 |
| B. Laminated tape: | |
| Lot 1 | 54.7 |
| Lot 2 | 45.4 |
| Lot 3 | 48.9 |

[1] Average figures from 20 individual tests.

In view of the excellent tensile strength described above wherein it will be noted that my base member is more than twice the strength of a single paper tape, my tape lends itself to numerous uses in the photographic industry, two of which are illustrated by Figures 3 and 4.

Referring to Figure 3, there is diagrammatically shown an arrangement whereby photographic film or paper 31 may be attached to a wood or metal support 32 by means of a small piece of my adhesive tape. Even though the adhesive tape of the present invention is attached directly to the photographic material as at 34, I have found that my adhesive tape produces no unfavorable effects from the photographic standpoint.

Referring now to Figure 4, another arrangement is shown wherein my tape may be used. A piece of photographic film or paper 41 may be securely attached to a film reel or spool 42 merely by fastening a piece of my adhesive tape 43 to one side of the film as at 44, encircling the spool and attaching it to the other side of the film as at 45. Such an arrangement renders the attachment of the film to the spool much more secure than prior methods whereby a tab on the end of the film was inserted through a slot in the spool.

It must be understood from the foregoing that the uses of my adhesive tape just mentioned are illustrative and not limiting, and various other uses may be made of my tape.

I claim:

1. As an article of manufacture a flexible paper adhesive tape exhibiting substantial lengthwise tensile strength but being susceptible of relatively easy crosswise severance by tearing, said tape being made up of a foundation member comprised of two relatively thin flexible strips of hemp paper laminated together by adhesive, said adhesive being comprised in parts by weight of rubber, between 7 and 11 parts; rosin, between 3.5 and 5.5 parts; pitch, between 5 and 8 parts; and zinc oxide, between 4 and 6 parts; the outside of one of the strips of paper being coated with a relatively impermeable coating composition which contains a cellulose derivative as an essential ingredient and the other paper surface of the foundation being coated with a plurality of coats of the adhesive aforesaid.

2. As an article of manufacture a flexible paper adhesive tape exhibiting substantial lengthwise tensile strength but being susceptible of relatively easy crosswise severance by tearing, said tape being made up of a foundation member comprised of two relatively thin flexible strips of hemp paper laminated together by adhesive, said adhesive being comprised in parts by weight of rubber, between 7 and 11 parts; rosin, between 3.5 and 5.5 parts; pitch, between 5 and 8 parts; and zinc oxide, between 4 and 6 parts; the outside of one of the strips of paper being coated with a relatively impermeable coating composition comprised of cellulose acetate butyrate and opal wax and the other paper surface of the foundation being coated with a plurality of coats of the adhesive aforesaid.

3. As an article of manufacture a flexible paper adhesive tape exhibiting substantial lengthwise tensile strength but being susceptible of relatively easy crosswise severance by tearing, said tape being made up of a foundation member comprised of two relatively thin flexible strips of hemp paper laminated together by adhesive, said adhesive being comprised in parts by weight of rubber, between 7 and 11 parts; rosin, between 3.5 and 5.5 parts; pitch, between 5 and 8 parts; and zinc oxide, between 4 and 6 parts; the outside of one of the strips of paper being coated with a relatively impermeable coating composition comprised of plasticized nitrocellulose and shellac and the other paper surface of the foundation being coated with a plurality of coats of the adhesive aforesaid.

JAMES S. GERHARDT.

References Cited in the file of this patent

UNITED STATES PATENTS

| Number | Name | Date |
|---|---|---|
| 812,384 | Thoma | Feb. 13, 1906 |
| 1,368,547 | Currier et al. | Feb. 15, 1921 |
| 1,969,858 | Schnitzler | Aug. 14, 1934 |
| 1,986,954 | Abrams et al. | Jan. 8, 1935 |
| 2,143,600 | Humphner | Jan. 10, 1939 |
| 2,208,619 | Armor et al. | July 23, 1940 |
| 2,236,527 | Drew | Apr. 1, 1941 |
| 2,334,585 | Schieman | Nov. 16, 1943 |
| 2,481,687 | Salo et al. | Sept. 13, 1949 |